March 11, 1924.

E. V. CROWELL

PACKING RUBBER

Original Filed Aug. 13, 1921

1,486,420

WITNESSES

INVENTOR
E. V. Crowell,
BY
ATTORNEYS

Patented Mar. 11, 1924.

1,486,420

UNITED STATES PATENT OFFICE.

ERD V. CROWELL, OF TULSA, OKLAHOMA.

PACKING RUBBER.

Original application filed August 13, 1921, Serial No. 492,056. Divided and this application filed October 13, 1921. Serial No. 507,437.

*To all whom it may concern:*

Be it known that I, ERD V. CROWELL, a citizen of the United States, and a resident of Tulsa, in the county of Tulsa and State of Oklahoma, have invented certain new and useful Improvements in Packing Rubbers, of which the following is a specification.

The present invention relates to an improved rubber utilized in conjunction with the tubing oil saver forming the subject-matter of my co-pending application, Serial No. 492,056 filed Aug. 13, 1921, now Patent No. 1,472,555, dated October 30, 1923, and the present application is a division of the said application.

The object of the invention is to provide an improved rubber of this character which is adapted to effectively engage the tubing of the oil well to efficiently pack the same, the disk being so constructed as to be endowed with a capacity so as to flex to permit of the passage of the couplings of the tube and yet at the same time to present sufficient strength to withstand the pressures of the oil and gas exerted thereupon.

Another object is to provide a rubber of this character which is susceptible of being selectively moved into packing engagement with the tubing and out of packing engagement and away from the tubing.

Another object is to provide a rubber of this character which is of generally simple and durable construction, reliable in operation and easy and inexpensive to manufacture and replace.

Other objects and advantages of the invention reside in certain novel features of construction, combination and arrangement of parts, which will be hereinafter more fully described and particularly pointed out in the appended claims, reference being had to the accompanying drawings forming part of this specification, and in which:

Figure 1:
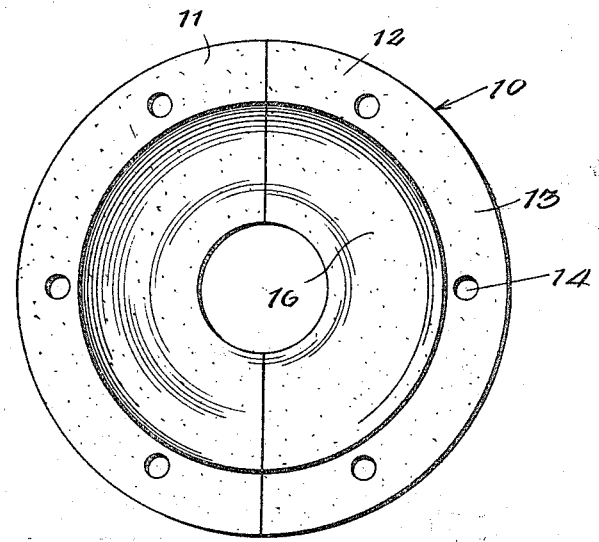
Figure 1 is a plan view of the preferred embodiment of the invention.
Figure 2:
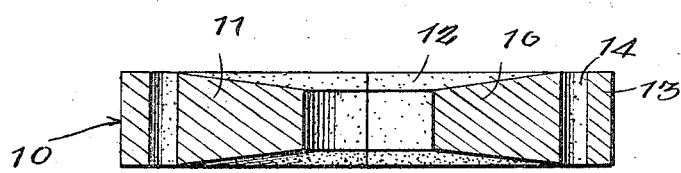
Figure 2 is a view thereof in transverse vertical section.

Referring to the drawings wherein for the sake of illustration is shown the preferred embodiment of the invention, the numeral 10 designates generally the rubber which takes the form of a disk and which includes two sections 11 and 12, the sections being of identical construction and being symmetrical so that each forms a half of the disk.

In cross-section, the disk comprises an outer ring or body 13 of rectangular cross section having a series of openings 14 therethrough constituting bolt holes or openings. Inwardly of the ring portion 13 the disk is provided with an elastic portion 16 which in cross section takes the form of a trapezium. The major parallel side of the trapezium is adjacent the ring 13 and the minor parallel side thereof constitutes the inner periphery of the ring, it being understood of course that the flexing portion 16 and the ring portion 13 are integral in their respective sections. By thus forming the flexing portion 16 it tapers on both its upper and lower faces inwardly so that this upper and lower face converge toward each other and so that the cross section of the flexing portion is reduced toward the center of the disk in such manner as to provide for a maximum flexion and strength.

In use, the rubber disk is susceptible, by virtue of its sectional construction, of being readily moved into contacting engagement with the tubing or of being moved out of packing engagement with and away from the tubing. When engaged with the tubing it prevents the escape of oil or gases between it and the tubing and yet at the same time its flexing portion 16 permits of the passage of the couplings of the tubing, this flexing action being enhanced by the sectional construction of the disk.

I claim:

1. In a device of the character described, a rubber member including sections and comprising a peripheral ring portion of rectangular cross section and an inner flexing portion integral with the ring portion and taking the form of a trapezium in cross section with the major parallel side of the trapezium adjacent the ring portion and the minor side thereof constituting the inner peripheral face of the member, all as and for the purposes set forth.

2. In a device of the character described, a rubber member including sections and comprising an outer ring portion and an inner flexing portion tapered from the ring portion toward the inner periphery of the member and symmetrically formed with respect to the plane of the ring portion, said inner ring portion having a packing surface which constitutes the inner peripheral surface of the member.

ERD V. CROWELL.